United States Patent
Young et al.

(10) Patent No.: US 7,350,076 B1
(45) Date of Patent: Mar. 25, 2008

(54) SCHEME FOR DEVICE AND USER AUTHENTICATION WITH KEY DISTRIBUTION IN A WIRELESS NETWORK

(75) Inventors: Albert Young, Cupertino, CA (US); Victor Chang, San Jose, CA (US); Danny M. Nessett, Fremont, CA (US)

(73) Assignee: 3Com Corporation, Marlborough, MA (US)

( * ) Notice: Subject to any disclaimer, the term of this patent is extended or adjusted under 35 U.S.C. 154(b) by 733 days.

(21) Appl. No.: 10/016,558

(22) Filed: Dec. 6, 2001

Related U.S. Application Data

(60) Provisional application No. 60/291,796, filed on May 16, 2001.

(51) Int. Cl.
*H04L 9/00* (2006.01)
*G06F 15/16* (2006.01)
*G06F 17/30* (2006.01)
*G06F 7/04* (2006.01)
*G06F 7/58* (2006.01)
*G06F 9/00* (2006.01)
*G06F 15/173* (2006.01)

(52) U.S. Cl. .............................. 713/169; 726/4; 726/12; 709/225

(58) Field of Classification Search .................... 726/4, 726/12; 713/169; 709/225
See application file for complete search history.

(56) References Cited

U.S. PATENT DOCUMENTS

| | | | | |
|---|---|---|---|---|
| 5,701,343 A | * | 12/1997 | Takashima et al. ........... | 705/51 |
| 5,740,361 A | * | 4/1998 | Brown ............................ | 726/5 |
| 6,070,243 A | * | 5/2000 | See et al. ...................... | 726/2 |
| 6,075,860 A | | 6/2000 | Ketcham ....................... | 380/25 |
| 6,173,400 B1 | * | 1/2001 | Perlman et al. .............. | 713/172 |
| 6,856,800 B1 | * | 2/2005 | Henry et al. ................. | 455/411 |
| 7,039,021 B1 | * | 5/2006 | Kokudo ........................ | 370/310 |
| 7,039,190 B1 | * | 5/2006 | Engwer et al. ............. | 380/270 |
| 2002/0012433 A1 | * | 1/2002 | Haverinen et al. .......... | 380/247 |
| 2002/0144128 A1 | * | 10/2002 | Rahman et al. ............. | 713/186 |

OTHER PUBLICATIONS

Aboba, B. et al. "PPP EAP TLS Authentication Protocol" (RFC2716), Oct. 1999, <ftp://ftp.rfc-editor.org/in-notes/rfc2716.txt>.*
Blunk, L. et al. "PPP Extensible Authentication Protocol (EAP)" (RFC2284), Mar. 1998, <ftp://ftp.rfc-editor.org/in-notes/rfc2284.txt>.*
Derfler, Frank J. et al. How Networks Work, Sep. 2000, pp. 114-115.*

(Continued)

*Primary Examiner*—Kambiz Zand
*Assistant Examiner*—Michael J Simitoski

(57) ABSTRACT

In a computer network, a method of mutually authenticating a client device and a network interface, authenticating a user to the network and exchanging encryption keys. In one embodiment, the method comprises authenticating the client device at the local network device point, with which the client device exchanges an encryption key and then the user is authenticated by a central authentication server. In another embodiment, the method comprises authenticating the client device at the central authentication server, with which the client device exchanges a key which is passed to the network device with a secret shared between the central authentication server and the network device. In this embodiment, the user is also authenticated at the central authentication server.

7 Claims, 8 Drawing Sheets

OTHER PUBLICATIONS

Microsoft Corporation. Computer Dictionary, Third Edition, 1997, p. 415.*
Schneier, Bruce. Applied Cryptography, Second Edition, 1996 John Wiley & Sons, Inc., pp. 53-56.*
Aboba, B. et al. "PPP EAP TLS Authentication Protocol", Oct. 1999, RFC 2716.*
Rigney, C. et al. "Remote Authentication Dial In User Service (RADIUS)", Jun. 2000, RFC 2865.*
Stallings, William. Network Security Essentials, Applications and Standard, 2000 Prentice-Hall, Inc., pp. 203-223.*
Halasz, David, et al. "TGe Security Baseline", Nov. 2000, <ftp://dimacs.rutgers.edu/pub/dimacs/TechnicalReports/TechReports/2001/2001-43.ps.gz>.*
Sakura et al. "Service Description and Usage of Identities/Numbers for FPLMTS" 1995 Fourth IEEE International Conference on Universal Personal Communications Record. Gateway to the 21st century. Tokyo, Nov. 6-10, 1995, vol. 1 Conf. 6, Nov. 6, 1995, pp. 168-172, XP010160521 ISBN: 0-7803-2955-4 p. 168, left-hand column, p. 170, left-hand column figure 5 p. 171, left-hand column, line 1 p. 172, left-hand column, line 12 p. 172, line 22-line 30.

Brown, D. "Techniques for privacy and authentication in personal communication systems a well designed P&A technique is nevassary to protect assets" IEEE Personal Communication, IEEE Communications Society, US vol. 2, No. 4, Aug. 1, 1995, pp. 6-10, XP000517583 ISSN: 1070-9916 p. 8, right-hand column p. 10 right hand column.

PCT Written Opinion for application No. PCT/US02/15642, Aug. 14, 2007.

Aboba et al., "PPP EAP TLS Authentication Protocol," Requests for Comments: 2716, Oct. 1999, <ftp://ftp.rfc-editor.org/in-notes/rfc2716.txt>.

Derfler, Frank J. et al., "How Networks Work," Sep. 2000, pp. 114-115.

Microsoft Corporation, Computer Dictionary, Third Edition, 1997, p. 415.

Schneier, Bruce, "Applied Cryptography," Second Edition, 1996 John Wiley & Sons, Inc., pp. 53-56.

* cited by examiner

SCHEME FOR DEVICE AND USER AUTHENTICATION WITH KEY DISTRIBUTION IN A WIRELESS NETWORK

RELATED U.S. APPLICATIONS

This application claims priority to the now abandoned provisional patent application: Patent Application Ser. No. 60/291,796, entitled "A scheme for a scalable device and user authentication with key distribution in a wireless network," with filing date May 16, 2001, and assigned to the assignee of the present invention.

FIELD OF THE INVENTION

The present invention relates to the field of computer networks. More particularly, the present invention relates to authentication processes and encrypted communication in network environments.

BACKGROUND OF THE INVENTION

Continued advancements in hardware technology and software development are enabling computer systems and other electronic devices, such as personal digital assistants, electronic books, cellular phones, etc., to be utilized in a variety of different implementations and applications. Some implementations are financial and commercial transactions, computer-aided design, communication, data storage and warehousing, education, etc. Additionally, coupling stand-alone computers and other electronic devices to form a networking environment greatly enhances their functionality. In a network environment, users are able to exchange information, share commonly stored files, combine resources, communicate via e-mail (electronic mail) and via video conferencing. Further, with the advent of wireless communication, networked computers can communicate and exchange information with nearly any other computer or other electronic device without having to be physically connected via a wired configuration.

In a wireless environment, there is a wireless client and an access point. The communication between the client and the access point is transmitted over public air space, so the communication is visible to anyone within range. In order to protect the privacy and contents of the transmitted communication, the information is commonly encrypted. To enable encryption, an encryption key is distributed to each of the clients utilizing the wireless network.

It is also important to assure that the client device is approved to receive an encryption key for a particular network and, conversely, that the network is approved for that particular client. It is also important that the user of the device also be approved for communication over the network. Therefore some form of authentication protocol must be employed in order to authenticate the devices, the network and the user.

There are a number of ways for a network to verify user identity in order to check whether it should grant access to its resources. For local area networks, the IEEE draft standard 802.1x/D11 specifies how to accomplish this. It establishes a basis for carrying authentication information from a supplicant to an authenticator, and optionally from the authenticator to an authentication server, in order to control access to the network by users.

In comparison to wireline networks, wireless networks have an additional problem to solve when users attempt to connect to them. Generally, wireline networks rely on protected distribution systems (e.g., conduit protected cabling, switches in locked wiring closets) to ensure the traffic they carry is not intercepted or modified in an unauthorized way. Wireless networks, on the other hand, communicate over publically accessible radio channels. Consequently, they must provide other means for protecting their traffic. Generally, this requires wireless networking devices to encrypt and integrity protect the traffic between them.

Several previous schemes have addressed the problem of user authentication, authorization and key distribution in wireless local area networks.

In one scheme, a user and the network mutually authenticate using a shared secret, generally a password. A complimentary scheme utilizes a secret shared by the user and a network to create an encryption key that can then be used to protect the confidentiality and integrity of the traffic between the user's wireless device and the network. The use of these two schemes has the advantage of securely authenticating the user and creating the encryption key.

However, as the number of access points increases, creating and managing user names and passwords stored on them becomes more difficult. In particular, if there is more than one access point in the network to which a wireless device can attach, all such devices must use a copy of the same user name/password database. This implies that when a password is changed, a user is added or a user is deleted from the database, these changes must be securely distributed to the other access points. When there are a large number of access points, it becomes difficult to keep each individual copy of the user name/password database synchronized. This can create security hazards.

To address these scaling issues, other inventions and approaches utilize a centralized database stored in a third-party system (this may store user names and passwords or other authentication information). The co-pending, commonly-owned U.S. patent application Ser. No. 09/560,396, filed Apr. 28, 2000, by Danny M. Nessett, et. al., entitled "Authenticated Diffie-Hellman Key Agreement Protocol where the Communicating Parties Share a Secret Key with a Third Party," hereby incorporated by reference as background material, describes a scheme in which a wireless device (potentially in concert with the user employing the device) and the network create a shared encryption key using authenticated Diffie-Hellman key agreement. This key is used to confidentiality- and integrity-protect the traffic between them. During the Diffie-Hellman key agreement exchange, both the wireless device and the access point sign the information used to generate the shared secret key and this information is forwarded to a trusted third party. The signatures use a secret that the wireless device or user of the wireless device shares with the third party and a different secret that the access point shares with the third party. The trusted third party tests the signatures and if they are correct resigns the information in such a way that both the wireless device and the access point are assured that the information came from each other.

Once the exchange completes, the only parties that know the shared key are the wireless device and the access point. The trusted third party does not know the key. A disadvantage of the invention is it requires significant processing capability on both the wireless device and the access point. This can increase the cost of these devices and therefore reduce the market for them. Another disadvantage is it requires a specialized server or process to sign and resign information.

To mitigate the first disadvantage, co-pending, commonly-owned U.S. patent application Ser. No. 09/561,416, filed Apr. 28, 2000, by Danny M. Nessett, et. Al., entitled "Enhancement to Authentication Protocol That Uses a Key Lease," hereby incorporated by reference as background material, describes a scheme in which once a wireless device and access point mutually authenticate and share a secret key, the two devices can quickly re-authenticate and re-establish this key without going through a more resource intensive protocol exchange. For example, suppose the wireless device and access point mutually authenticate and establish a shared key using the invention described in the above referenced patent application Ser. No. 09/560,396. If the wireless device loses contact with the access point, then re-establishes contact, the wireless device and access point can use the quick re-authentication scheme to mutually authenticate and establish a secret shared key without incurring the overhead inherent in the scheme described in Ser. No. 09/560,396.

Even with quick re-authentication, some wireless devices and access points may not have sufficient computational resources to execute the procedures described in patent application Ser. No. 09/560,396 in sufficient time to meet user and system requirements in some deployments. There exists one scheme which calls for offloading onto an access point server most of the computational burden necessary for the wireless device and access point to mutually authenticate and create a shared key. The scheme has the advantage of relieving this burden, but has the disadvantage of revealing the shared key to the access point server. In some deployments, this may be an acceptable risk in order to reduce the computational load on the wireless device and/or the access point. In other deployments this risk may be unacceptable. This scheme shares with the authenticated Diffie-Hellman scheme the disadvantage that it requires a specialized server or process to sign and resign information.

Others have proposed solutions to the problem of mutual authentication and shared key distribution in a wireless network. One approach uses the Extensible Authentication Protocol and EAP-TLS. In this scheme, the wireless device authenticates to an authentication server which is generally external to the access point, but in secure contact with it, using TLS with client side certificates. This protocol (with the optional client side certificates) mutually authenticates the wireless device and the authentication server (NB: not the wireless client and the access point) and establishes a shared secret between them. The authentication server then uses its secure channel to the access point to send it the shared key (precisely, the authentication server sends to the access point all of the information necessary to compute a key it will then share with the wireless device). It also vouches for the identity of the wireless device to the access point.

The advantages of this scheme are the use of standard security protocols (i.e., TLS, EAP-TLS) and the very light computational burden on the access point. The disadvantages are it requires the deployment of a public key infrastructure (to support client-side certificates) and the key shared between the wireless device and the access point is also known (technically, the information used to generate it is known) by the authentication server.

Another approach uses Kerberos, the protocol EAP-GSS, and 802.1x to mutually authenticate the wireless device and access point and to distribute a shared key between them. In this scheme, the access point acts as a Kerberos server, using the IAKERB protocol to accept and forward requests to the KDC on behalf of the wireless device (which acts as a Kerberos client). In rough overview, the wireless device contacts the KDC through the access point, receiving a ticket to the Kerberos server running on the access point. In the process the access point server gets a ticket for a (pseudo-) server running on the wireless device. The two use these tickets to mutually authenticate and to establish a shared encryption key.

An advantage of this scheme is it distributes a ticket to the wireless device, which can be used later to reconnect to the access point without an interaction with the Kerberos KDC. Another advantage is it uses standard protocols to implement some of its functionality. The disadvantages of the scheme are it requires the deployment of a Kerberos infrastructure, the key is known to the KDC as well as to the wireless device and access point, significant processing by both the wireless device and access point is required for each Kerberos transaction (e.g., the initial exchange, use of the ticket by the wireless device for re-authentication) and it uses non-standard protocols (at the time of this writing), specifically EAP-GSS and IAKERB to implement part of its functionality.

One issue that has not been discussed in regards to these schemes is how they fit into existing deployments. It is unlikely that a small business will have sufficient expertise and resources to implement any kind of security infrastructure. Consequently, the schemes described in co-pending, commonly-owned U.S. patent application Ser. No. 09/561,088, filed Apr. 28, 2000, by Albert Young, et. al., entitled "Protected Mutual Authentication Over an Unsecured Wireless Communication Channel," and Ser. No. 09/900,617, filed Jul. 6, 2001, by Danny M. Nessett, et. al, entitled "Using a Key Lease in a Secondary Authentication Protocol After a Primary Authentication Protocol Has Been Performed," hereby incorporated by reference as background material, are generally advantageous in these types of deployments.

Small and medium enterprises also may not have the expertise and resources to implement a significant security infrastructure, in which case they are in the same position as a small business. However, another issue for small, medium and large enterprises is how these schemes fit into an existing deployment. One consideration is which authentication server to use.

Almost without exception, remote access to enterprise networks uses a RADIUS server to control user access to it. If enterprises supporting remote access use a different user authentication server for wireless network protection than a RADIUS server, they will either have to find a way to combine the two server databases or maintain and manage the authentication databases separately, one for remote access and one for access to the wireless network. Both of these strategies are particularly difficult when one of the user authentication servers is a Kerberos KDC, since it does not store the passwords associated with a user name directly. Rather, it stores a hash of the password, which it uses as an encryption key.

Attempting to combine a RADIUS server and Kerberos KDC by using a common authentication database would require either the storage of passwords (which the KDC would then have to convert dynamically to encryption keys) or using the hashed passwords as the secret used by the RADIUS server and client for authentication. The former approach violates one of the design objectives of Kerberos, which is to avoid storing passwords on the server. No known Kerberos KDC implementation supports this. The latter approach is impractical, since widely deployed remote access clients do not transform passwords into authentication data using the Kerberos transformation algorithm.

There is another scheme that addresses the problem of combining the authentication databases for wireless network protection and remote access. For wireless network protection, it splits the mutual authentication and key distribution steps into two stages. It does this by holding device identifiers and shared secrets associated with those identifiers on access points and client devices and holding user identifiers on a centralized user authentication database.

This scheme uses this data in the following way. First, the network and client device mutually authenticate using the device identifier and its associated shared secret. During this process a key is generated to protect communications between the two. Once this is complete, the user authenticates to the network through a central authentication server that has access to the centralized user authentication database. This database can be used for user authentication to control access to the wireless network and to control access to the network from a remote location.

Only this latter scheme supports the use of a common remote access and wireless network user authentication database for deployments using standard remote access mechanisms. However, this scheme doesn't scale. For deployments with a large number of access points, managing the client identifiers and shared secrets on each in a way that keeps the data synchronized is very difficult.

What is needed is a method and system for mutually authenticating the user device and the access point. What also is needed is a key that can be used by the user device and access point to protect their communications. Once communications between the user device and access point are protected, the user device needs to utilize the user's identification for user authentication to the network using a centralized authentication system. What also is needed is a common authentication database for both wireless network access and remote access without introducing significant computational burden on either the user device or access point.

SUMMARY OF THE INVENTION

Accordingly, the present invention provides a method for mutually authenticating the user device and the access point. The present invention establishes a key that can be used by the user device and access point to protect their communications. This key can be established by the network device (e.g., local access point) or it can be established by a central authentication server. Once communications between the user device and the network device are protected, the user device can utilize the user's identification for user authentication to the network using a centralized authentication system. A common authentication database for both wireless network access and remote access is utilized without introducing significant computational burden on either the user device or access point.

In one embodiment the present invention provides a method for authenticating access to a controlled network. In one embodiment, the present invention authenticates a second electronic device to a first electronic device and then authenticates the first electronic device to the second electronic device. The first electronic device and the second electronic device then determine a key for encrypting communication between the two devices based on a secret they share. The first electronic device and the second electronic device then authenticate a user to a central authentication server. In one embodiment, the first electronic device is a client device and the second electronic device is a network device. In another embodiment, the second electronic device is a central authentication server.

Other features and advantages of the present invention will become apparent to those of ordinary skill in the art after having read the following detailed description of the preferred embodiments taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
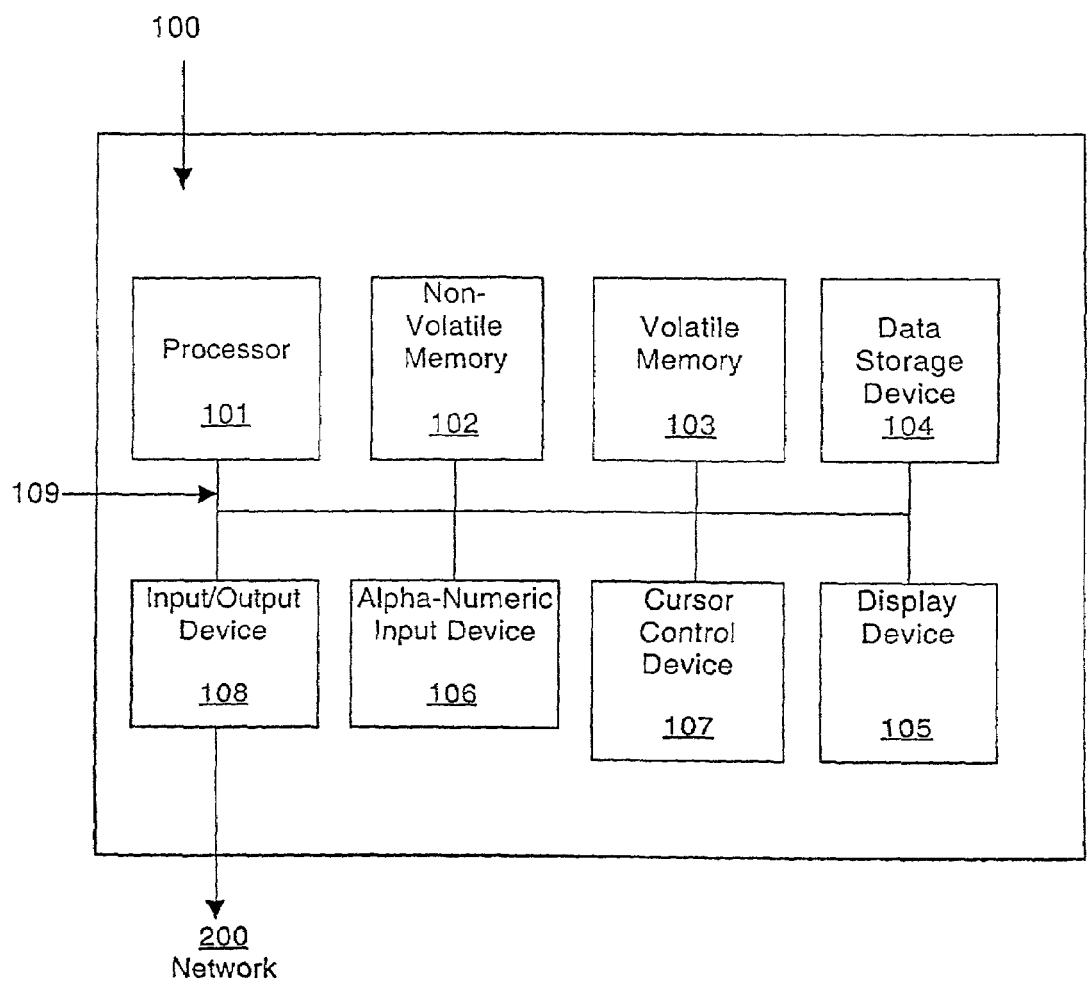
FIG. 1 illustrates an exemplary electronic system platform upon which embodiments of the present invention can be practiced.

Reference will be made in detail to the preferred embodiments of the present invention, examples of which are illustrated in the accompanying drawings. While the invention will be described in conjunction with the preferred embodiments, it is understood that they are not intended to limit the invention to these embodiments. Contrarily, the invention is intended to cover alternatives, modifications, and equivalents, which may be included within the spirit and breadth of the invention as defined by the appended claims. Additionally, in the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. Additionally, in other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "determining" or "receiving" or "verifying" or "encrypting" or "sending" or "transmitting" or "decrypting" or "enabling" or "computing" or "calculating" or "providing" or "conveying" or the like, refer to the action and processes of an electronic system or a computer system or similar electronic computing device such as a PDA (personal digital assistant), cell phone, pager, optical or mechanical computer, etc. The electronic device or similar computer system or other device manipulates and transforms data represented as physical (electronic) quantities within the computer system's registers and memories into other data similarly represented as physical quantities within the computer system memories or registers or other such information storage, transmission or display devices.

In a preferred application, embodiments of the present invention are implemented in conjunction with authentication. In one embodiment, the authentication protocol is supported by EAP-TLS protocol. It should be appreciated that embodiments of the present invention may be utilized with other authentication protocols.

It should be appreciated that additional notations are utilized in the detailed description to follow. Some of the additional notations are as follows:

|: The concatenation operator. Indicates the linking of objects according to some protocol.

Digest(n); The message digest of n. Indicates a one-way hash function.

Dev_id: An identifier associated with a device.

Secret(Dev_id): A secret shared by the client device and the network to which it connects.

User_name: The name of a user.

User_credentials: The credentials of the user as used for authentication.

Shared_key: The bits selected from Digest(Dev_id, Secret (Dev_id), x, y).

Dev_certificate: The public key certificate of the client device.

Serv_certificate: The public key of the central authentication server.

Exemplary Computer System

With reference to FIG. 1, portions of the present invention are comprised of computer-readable and computer executable instructions which reside, for example, in computer-readable media of an electronic system such as a computer system. FIG. 1 illustrates an exemplary electronic device 100 upon which embodiments of the present invention may be practiced. It should be appreciated that electronic device 100 of FIG. 1 is an exemplary representation of a number of different computer systems and electronic devices in which the present invention can operate, including but not limited to desktop computers, laptop computers, PDAs (personal digital assistants), cell phones, pagers, etc.

Electronic system 100 includes an address/data bus 109 for communicating information, a processor 101 coupled with bus 109 for processing information and instructions, a non-volatile memory (ROM—read only memory) 102 coupled with bus 109 for storing static information and instructions for processor 101, and a volatile memory (RAM—random access memory) 103 coupled with bus 109 for storing information and instructions for the processor 101. Electronic device 100 also includes data storage device 104 such as a magnetic or optical disk and disk drive coupled with bus 109 for storing information and instructions. Data storage device 104 can include one or more removable magnetic or optical storage media, e.g., diskettes, tapes, SD (secure digital) cards, MMC (multi-media cards), which are computer readable memories. Memory units of electronic device 100 include volatile memory 102, non-volatile memory 103, and data storage device 104.

Electronic device 100 of FIG. 1 also includes an input/output device 108 which is coupled to bus 109 for providing a physical communication link between electronic device 100 and a network 200. As such, input/output device 108 enables central processor unit 101 to communicate with other electronic systems coupled to the network 200. It should be appreciated that within the present embodiment, input/output device 108 provides the functionality to transmit and receive information over a wired as well as a wireless communication interface (such as an IEEE 802.11b interface).

Electronic device 100 can also include an optional alphanumeric input device 106 which includes alphanumeric and function keys coupled with bus 109 for communicating information and command selections to processor 101. An optional display device 105 can be coupled with bus 109 for displaying information to a computer user. Display device 105 may be a liquid crystal display (LCD), a cathode ray tube (CRT), another flat panel display, an electronic paper display, or other display device suitable for creating graphic images and alphanumeric characters recognizable to a user.

Electronic device 100 also includes an optional cursor control or directing device 107 coupled with bus 109 for communicating user input information and command selections to processor 101. Cursor control device 107 allows the user to dynamically signal the two dimensional movement of a visible symbol (cursor) on a display screen of display device 105. Many implementations of cursor control device 107 and know in the art including a trackball, mouse, optical mouse, touch pad, touch screen, joystick, or special keys on alphanumeric input device 106 capable of signaling movement of a given direction or manner of displacement. Alternatively, it is appreciated that a cursor can be directed and/or activated via input from alphanumeric input device 106 using special keys and/or key sequence commands.

Exemplary Network Environment

Figure 2:
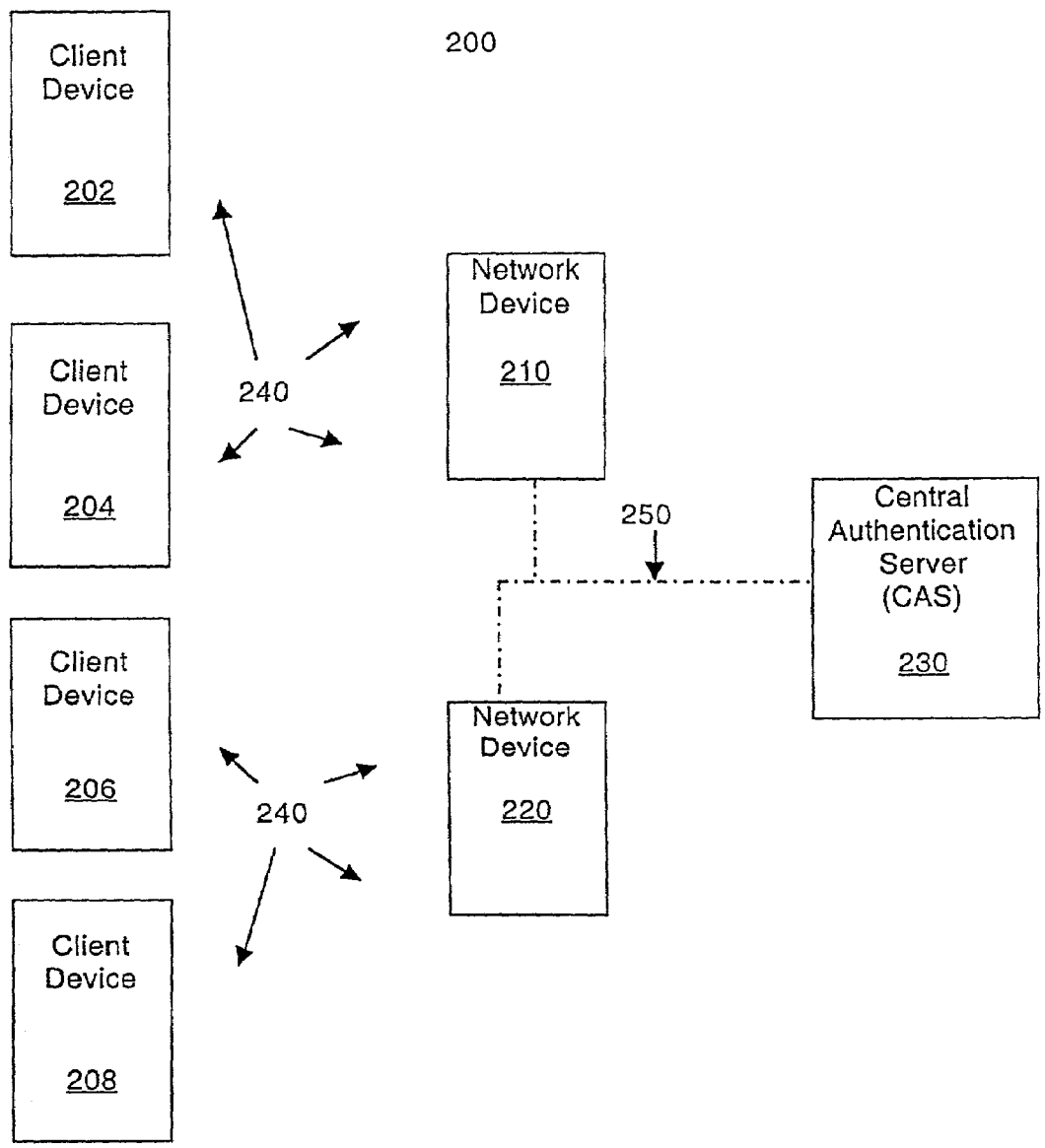
FIG. 2 illustrates an exemplary network environment including wireless and wired communication upon which embodiments of the present invention can be practiced.

Embodiments of the present invention, a scheme for device and user authentication with key distribution in a wireless network, include a system for providing a secure network for communication between a client device (such as a wireless client in a wireless network or a wireline client in a wireline network) and a network device (such as an access point in a wireless network or a modem in a wireline network) and may be practiced in a network environment. FIG. 2 illustrates an exemplary wireless network environment 200 in which one embodiment of the present invention may be practiced. The illustrated wireless network environment 200 includes a central authentication server (CAS) 230 coupled to network device 210 and to network device 220 via connection 250. In one embodiment, connection 250 is a physical (e.g., wired) connection, such as that in an Ethernet, token ring, or fiber optic network configuration. In another embodiment, connection 250 is a wireless connection utilizing wireless communication techniques such as infrared transmission, spread spectrum radio transmission, narrow band radio transmission, or other technology that does not require a physical (wired) connection between central authentication server 230 and network device 210 and network device 220.

Still referring to FIG. 2, it should be appreciated that in another embodiment, there may be only a single network device coupled with central authentication server 230 via connection 250. It should be further appreciated that in yet another embodiment, more than the two network devices shown in FIG. 2 may be coupled to CAS 230. Depending on the scope of the network environment in which embodiments of the present invention are implemented, in still another embodiment, there may be from tens to hundreds of network devices coupled with access server 230. It should further be appreciated that if connection 250 is a wireless connection between the CAS 230 and the network devices, 210 and 220 respectively, it is assumed that there is a previously distributed key in place between CAS 230 and the network devices.

Still referring to FIG. 2, wireless network environment 200 may include multiple wireless client devices (e.g., wireless client devices 202, 204, 206, and 208, respectively) coupled with network device 210 and network device 220 via wireless connection 240. It should be appreciated that the wireless client devices 202, 204, 206, and 208 are each able to communicate with either of the network devices 210 or 220. Additionally, connection 240, a wireless connection, utilizes wireless communication techniques such as infrared transmission, spread spectrum radio transmission, narrow band radio transmission, or other technology that does not require a physical (e.g., wired) connection between network devices 210 and 220 and the wireless clients 202, 204, 206, and 208. Wireless client devices 202, 204, 206, and 208, network devices 210 and 220, and central authentication server 230 may be implemented with an electronic system, for example electronic system 100 of FIG. 1. In the present embodiment, the wireless client devices, network devices, and the CAS are coupled to a number of network resources, e.g., file servers, printers, Internet gateways, etc., via connection 240 and 250.

Figure 3:
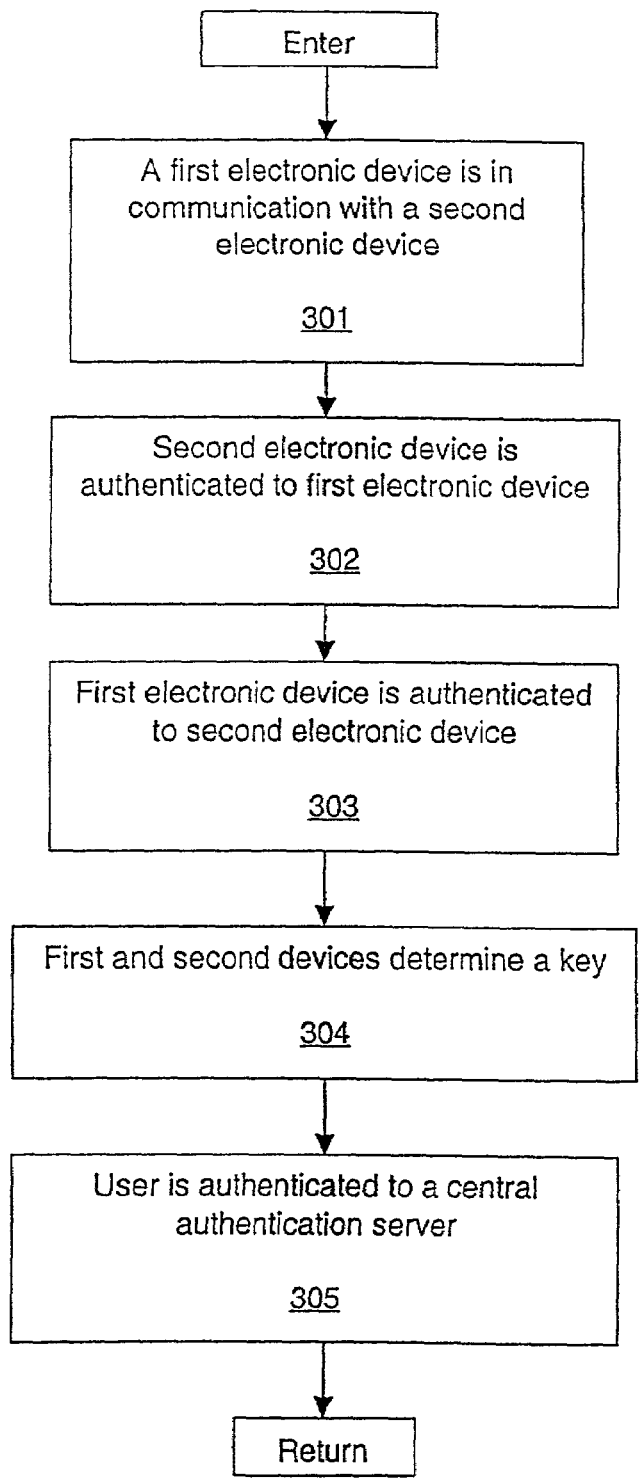
FIG. 3 illustrates a flow diagram depicting the authentication of electronic devices for exchanging a key and the authentication of a user for accessing a network.

FIG. 3 depicts process 300 in which, according to one embodiment of the present invention, electronic devices are authenticated for exchanging an encryption key and a user is authenticated for having access to a network. In step 301 of FIG. 3 a first electronic device is coupled with a second electronic device for communicating with a network. In one embodiment of the present invention the first electronic device is a client device such as a portable computer and the second electronic device is a network device such as a wireless access point. In another embodiment, the first device is a client device and the second device is a central network authentication server.

In order to establish a secure communication with the network, the electronic devices must be authenticated, each with the other. This two-way authentication is herein known as mutual authentication. Step 302 of FIG. 3 shows that, according to one embodiment of the present invention, the second device is authenticated to the first device using a conventional authentication protocol. In turn, as illustrated in step 303 of FIG. 3, the first device is authenticated to the second device. This constitutes mutual authentication and thus, the two devices are mutually authenticated.

In step 304, according to one embodiment, the mutually authenticated first and second electronic devices determine a key which is based on a secret which they share. Once determined, according to one embodiment, this key can be used to encrypt communications with the network to assure that the communications are secure.

Once secure communications are established, the user of the first electronic device must be authenticated for communicating with the network. In one embodiment, as illustrated by step 305 of FIG. 3, the user is authenticated by a central authentication server. Once the user is authenticated to the network, communications are established and the user can begin transmitting and receiving over the network.

Figure 4A:
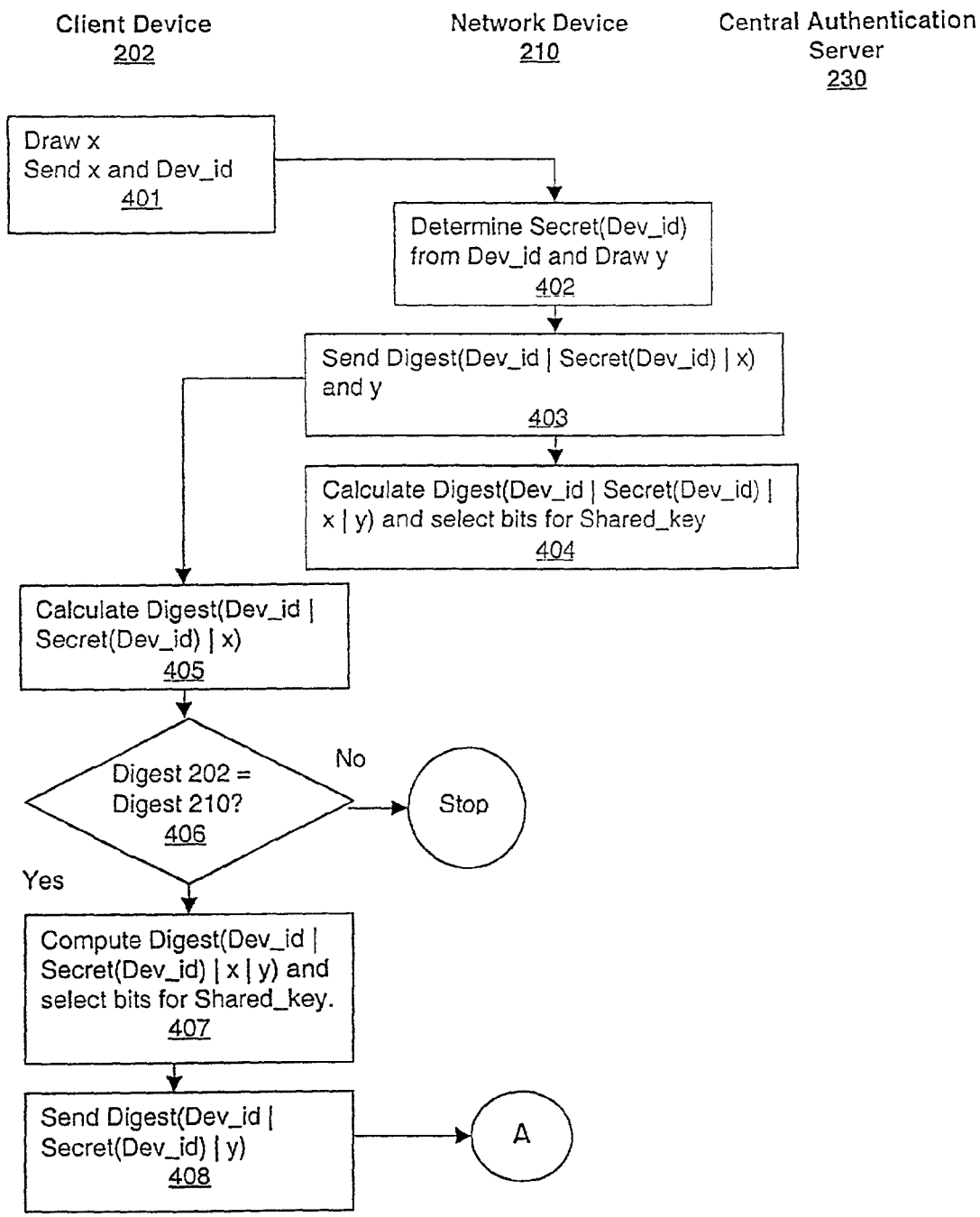
FIGS. 4A, 4B and 4C illustrate a data flow diagram depicting an exchange of messages in a process of authentication and key distribution, in accordance with one embodiment of the present invention.

Referring now to FIG. 4A, the initial steps of one embodiment of the present invention are presented by means of a data flow diagram 400. In this embodiment, the device secrets are stored on network devices such as 210 and 220 of FIG. 2, and therefore this embodiment is suitable for small businesses and other deployments in which the number of network devices is small and the logistics of updating the secrets is within reason. In this embodiment, the information flow is between the client device 202, the network device 210 and the central authentication server 230.

In step 401 of FIG. 4A the client device 202 begins by drawing a random number x. The client device 202 then sends the random number x along with its device identifier to the network device 210.

In step 402, the network device 210 uses the device identifier to determine the secret that it shares with the client device 202. The network device 210 then draws a random number y, so that now it has two random numbers, x and y.

In step 403 of FIG. 4A, according to one embodiment of the present invention, the network device 210 computes a one-way hash function, Digest(Dev_id | Secret(Dev_id) | x), based on the device identifier, the secret it shares with the client device 202 and the random number x sent from the client device 202. The network device 210 then sends Digest(Dev_id | Secret(Dev_id) | x) along with random number y to the client device 202. Other networks do not know the shared secret, Secret(Dev_id), so at this point the network device 210 is proving to the client device 202 that it is a valid network device.

The network device 210 then, in step 404 of FIG. 4A, calculates another hash function, Digest(Dev_id | Secret(Dev_id) | x | y) which is a digest of the device identifier which was sent from the client device 202 in step 401, the secret between the network device 210 and the client device 202, concatenated with the random numbers x and y. From this digest, the network device selects bits which it will use for an encryption key.

In step 405, the client device 202 calculates the Digest (Dev_id | Secret(Dev_id) | x) and, in step 406, compares this value with that received from the network device 210 in step 403. If the values do not match, then there is no authentication of the network device and the session is terminated. If the values match, then the network device 210 has shown that it is a valid device for client device 202 and therefore the network device 210 is authenticated to the client device 202.

In step 407 of FIG. 4A, the client device 202 determines the digest, Digest(Dev_id | Secret(Dev_id) | x | y), just as was done by the network device 210 in step 304. From this digest the client device 202 selects the same bits as did the network device in step 404 which the client device 202 can now use to encrypt all future communication with the network device 210.

Once the network device 210 is authenticated to the client device 202, the client device 202 must be authenticated to the network device 210 to achieve mutual authentication. In step 408 of FIG. 4A, the client device 202 computes a different one-way hash function, (Dev_id | Secret(Dev_id) | y), incorporating the random number y sent from the network device 210 in step 403 and sends this value to the network device 210.

Figure 4B:
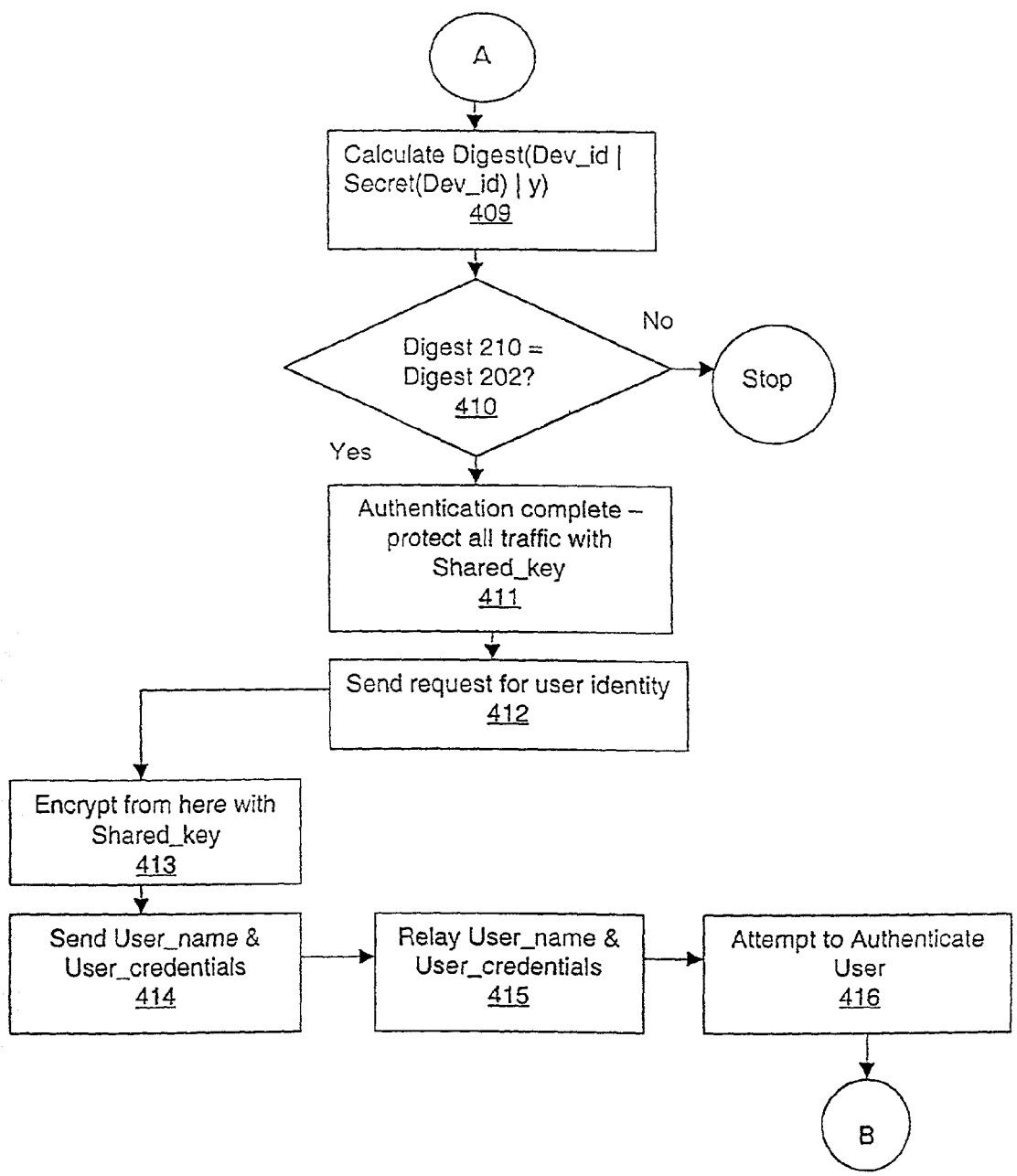

Now referring to FIG. 4B, step 409, the network device 210 independently calculates the digest, Digest(Dev_id | Secret(Dev_id) | y). In step 410, it then compares the value of the digest from step 409 to the value sent from the client device 202 in step 408 of FIG. 4A. If the values do not match, the session is terminated due to the client device 202 not being a valid device for network device 210. If the values match, the client device 202 is authenticated to the network device 210, and, according to one embodiment of the present invention, mutual authentication has been achieved.

Beginning with step 411 of FIG. 4B, traffic is allowed to flow and the network device 210 encrypts its transmission with the shared key it established in step 404 of FIG. 4A. In step 412 the network device 210 sends a message to the client device 202 asking for the identity of the user.

Beginning with step 413 of FIG. 4B, according to one embodiment of the present invention, the transmissions from the client device 202 are protected with the encryption key which it computed in step 407 of FIG. 4A. This encryption key is known only to the client device 202 and the network device 210 so that any interception of transmittals between the two devices can not be deciphered.

In step 414, according to one embodiment of the present invention, the client device 202 sends to the network device 210 the identity of the user along with some credentials which are needed to authenticate the user to the central authentication server 230.

The network device 210 then, in step 415 of FIG. 4B, relays the user identity and user credentials on to the central authentication server. In step 416, according to one embodiment, the central authentication 230 server attempts to authenticate the user to the network using one of several existing authentication protocols.

Figure 4C:
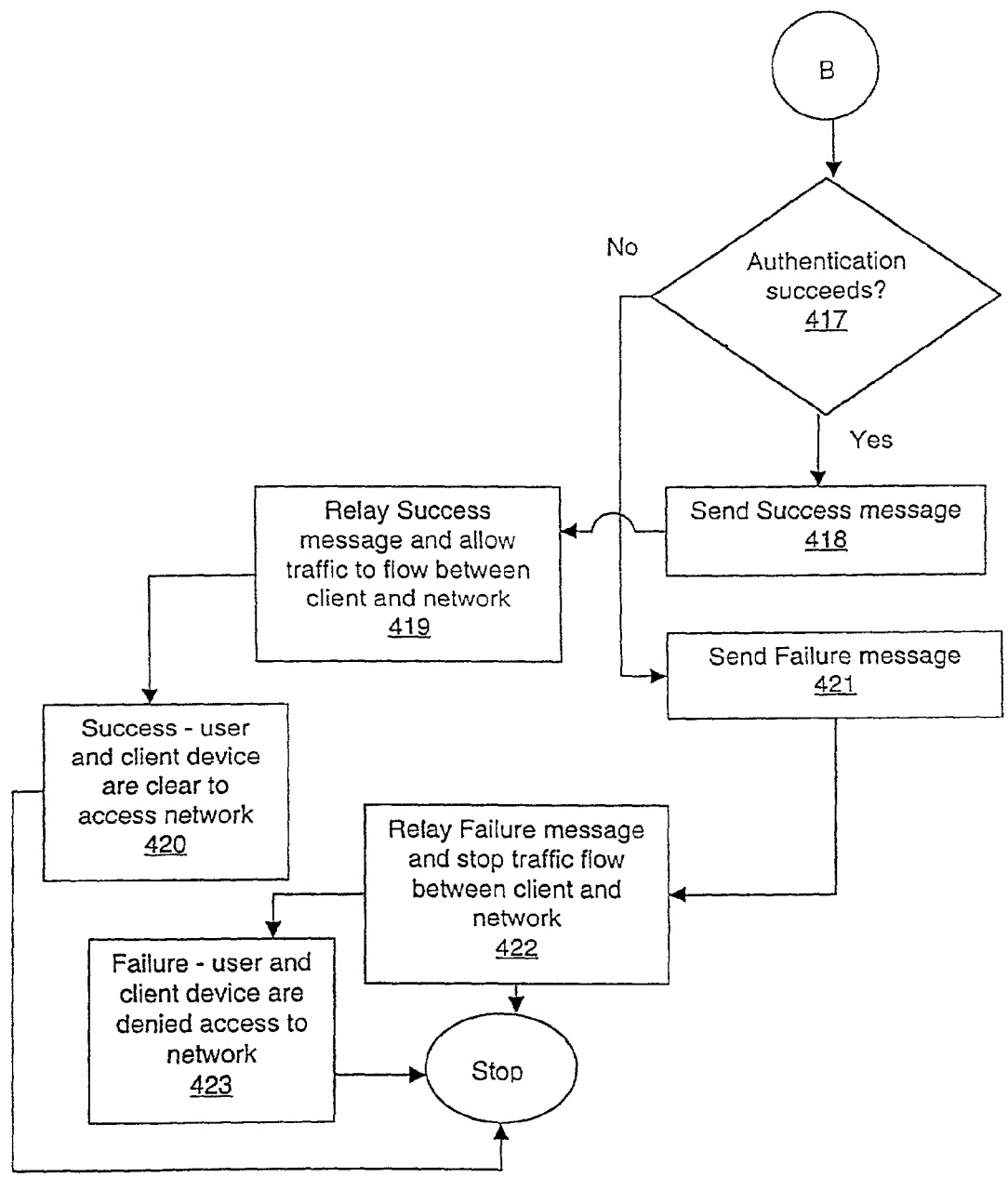

Referring now to FIG. 4C, in step 417, provided the authentication succeeds, the central authentication server 230 sends, as shown in step 418, a success message back to the network device 210.

In step 419 of FIG. 4C, the network device 210 relays the success message back to the client device 202 and allows the client device to have access to the network. Step 420 shows that the client device 202 receives the success message and can now proceed to send and receive information over the network.

If the authentication of step 417 of FIG. 4C fails, the central authentication server 230 sends a failure message to the network device 210 as shown by step 421. In step 422 the network device relays the failure message to the client device 202, denies the user access to the network and ceases transmission. Step 423 illustrates the user receiving the failure message.

Figure 5A:
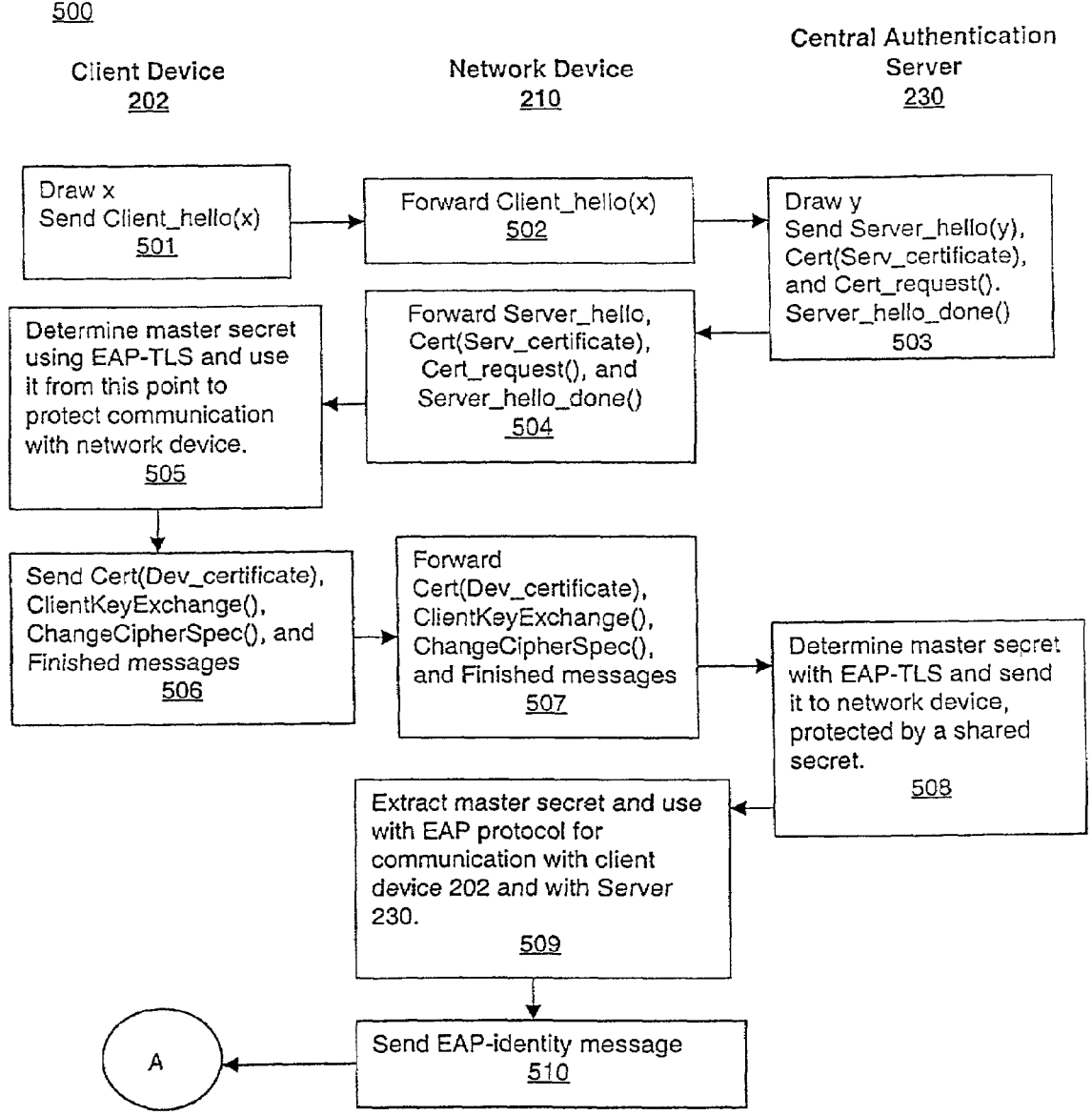
FIGS. 5A and 5B illustrate a data flow diagram depicting an exchange of messages in a process of authentication and key distribution, in accordance with a another embodiment of the present invention.

Referring now to FIG. 5A, another embodiment of the present invention is shown by flow diagram 500. For large businesses and deployments with a large number of network devices or access points, managing client identifiers and shared secrets on each network device in a way that keeps the data synchronized is very difficult. This embodiment of the present invention offers a scalable method by mutually authenticating the client device 202 and the central authentication server 230, establishing a key for protecting communication between the client device 202 and the network device 210 using the central authentication server, and authenticating the user to the central authentication server 230 for access to the network.

In this embodiment a standard protocol which is known to those of ordinary skill in the art is employed. This protocol is Extensible Authentication Protocol (EAP), and, for key distribution, Transport Layer Security (TLS), or EAP-TLS. EAP-TLS uses public key cryptography which authenticates at the central authentication server 230.

In step 501 of FIG. 5A, the client device 202 draws a random number x and sends it embedded in a "hello" message to the network device 210. In step 502 the network device 210 forwards the client "hello(x)" message on to the central authentication server (CAS) 230.

In step 503 the CAS 230 draws a random number y and sends a server "hello," in which it has embedded random number y, to the network device 210. Along with the "hello(y)" it sends the network device 210 a certificate which is the server's public key and a request message for the client certificate (or client public key) and a "hello—done" (or I'm finished) message.

In the present embodiment, the network device 210, in step 504, forwards the CAS 230 message from step 503 to the client device 202. In step 505 of FIG. 5A, the receipt of the certificate from the CAS 230 authenticates the CAS 230 to the client device 202. The client device 202 now uses this information and, with EAP-TLS protocol, determines a master secret from which the client device 202 extracts a session key which the client device 202 will use from this point to protect communication with the network device 210.

In step 506 the client device 202 sends its certificate, an EAP-TLS key exchange, a "change cipher spec" message and a "finished" message to the network device 210. In step 507, the network device 210 forwards the messages from the client device 202 to the CAS 230.

In step 508 of FIG. 5A the CAS 230 receives the message with the client device certificate with which the client device 202 is authenticated to the CAS 230. At this point, the client device 202 and the central authentication server 230 are mutually authenticated. The CAS 230 uses the other portions of the message and EAP-TLS protocol to determine the master secret from which it derives a session key. The CAS 230 then sends the master secret to the network device 202, protected by a secret which it shares with the network device 202.

In step 509 of FIG. 5A, according to the present embodiment, the network device 210 extracts the master secret and uses it with EAP protocol to encrypt and protect future communication with the client device 202 and the server 210.

According to one embodiment of the present invention, the network device 210, in step 510 of FIG. 5A, sends an EAP identity message to the client device 202, requesting the identity of the user.

Figure 5B:
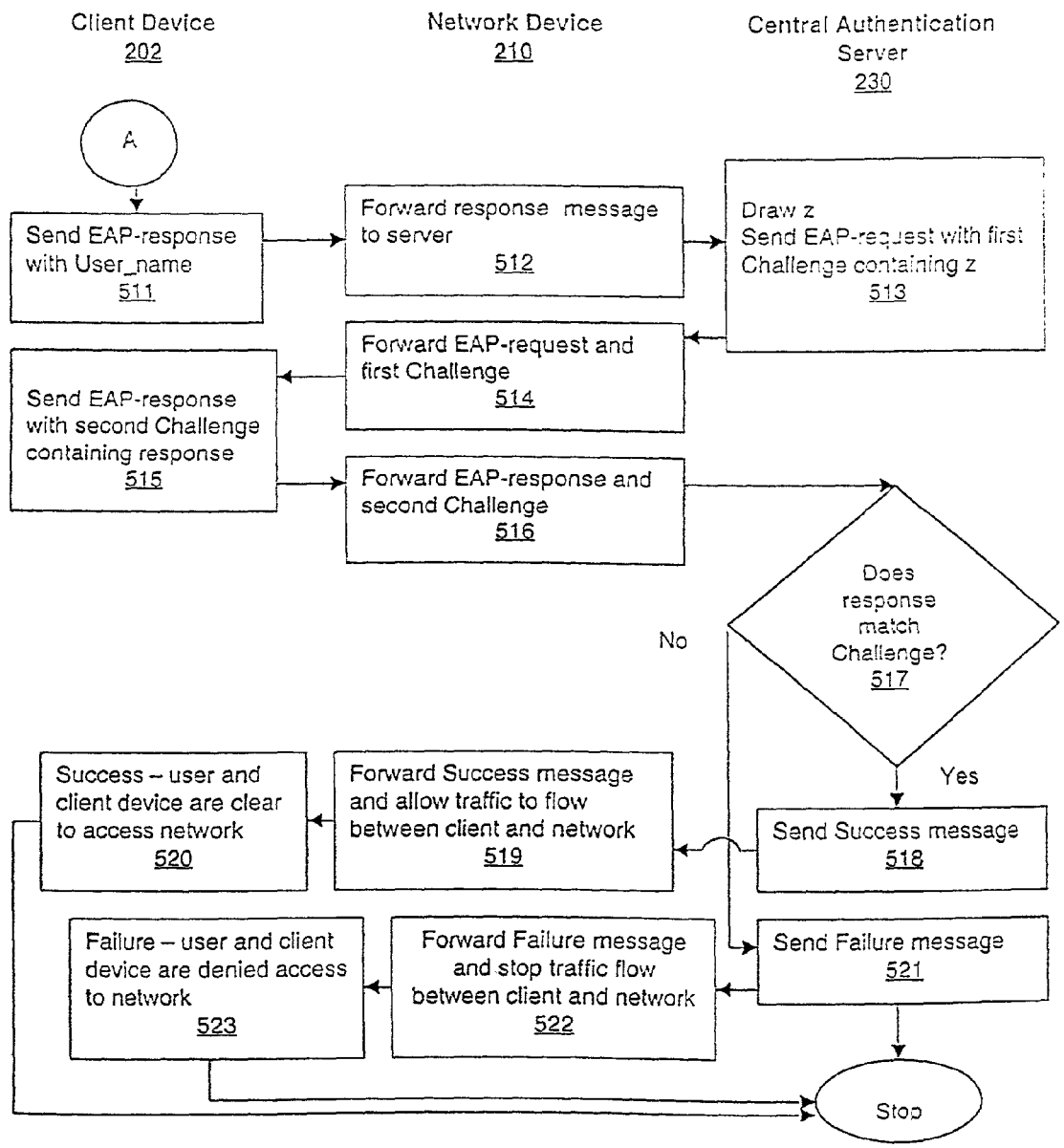

Referring now to FIG. 5B, the flow diagram 500 continues from FIG. 5A. According to one embodiment, the user authentication is completed by quick authentication. According to the present embodiment, in step 511 the client device 202 sends a standard EAP response to the network device 210 with the name of the user.

In step 512 of FIG. 5B, the network device 210 forwards the user name to the central authentication server (CAS) 230. In step 513 the CAS 230 draws a random number z and sends to the network device an EAP request and a first challenge containing the random number z.

In step 514 the network device 210 forwards the EAP request and the first challenge to the client device 202. In step 515 the client device 202 sends an EAP response with a second challenge containing the EAP response to the network device 210.

In step 516 of FIG. 5B the network device 210 forwards the second challenge with the EAP response to the CAS 230. The CAS 230 then, as shown in step 517, compares the first challenge which it sent to the client device 202 with the second challenge it received from the client device 202 and determines whether or not they match.

If the challenges match, the CAS 230 sends a success message to the network device 210 as shown in step 518. The network device 210 then forwards the message to the client device in step 519 and the user is now authenticated to the network so the network device allows traffic to flow between the client and the network. In step 520 the client device 202 receives the success message and can now send information to the network protected by a session key it shares with the network device 210.

If, in step 517, the challenges do not match, the CAS 230 sends a failure message to the network device 210 as shown in step 521 of FIG. 5B. In step 522 the network device 210 forwards the failure message to the client device 202 and blocks traffic flow between the client device 202 and the network.

In step 523 the client device receives the failure message which informs the user that access to the network is denied.

The foregoing descriptions of specific embodiments of the present invention have been presented for purposes of illustration and description. They are not intended to be exhaustive or to limit the invention to the precise forms disclosed. Obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing authenticated access to a controlled network, comprising:
   first authenticating a wireless access point to an unauthenticated client device communicatively coupled to the wireless access point via a wireless connection, wherein the first authenticating further comprises:
      receiving a first message from said unauthenticated client device at said wireless access point, said first message including a device identifier and a first random number;
      receiving a second message from said wireless access point at said unauthenticated client device, said second message including a second random number and a first digest, said first digest including a one-way hash function operating on said first random number, said device identifier, and a first secret shared between said wireless access point and said unauthenticated client device;
      determining a second digest at said unauthenticated client device, said second digest comprising a one-way hash function operating on said first random number, said device identifier, and said first secret;
      comparing said first digest to said second digest at said unauthenticated client device; and
      provided said first digest matches said second digest, authenticating said wireless access point to said unauthenticated client device;
   second authenticating the unauthenticated client device to the wireless access point to produce an authenticated client device and a key; and
   third authenticating, via the wireless access point, a user of the authenticated client device to a central authentication server using the key.

2. The method of claim 1 wherein the first authenticating and the second authenticating comprise a shared secret key exchange between the wireless access point and the unauthenticated client device.

3. The method of claim 1 wherein the second authenticating further comprises:
   receiving a third message from said unauthenticated client device at said wireless access point, said third message including a third digest, said third digest including a one-way hash function operating on said second random number, said device identifier, and said first secret;
   determining a fourth digest at said wireless access point, said fourth digest comprising said second random number, said device identifier, and said first secret;
   comparing said third digest to said fourth digest at said unauthenticated client device; and
   provided said third digest matches said fourth digest, authenticating said client device to said wireless access point to produce the authenticated client device.

4. The method of claim 1, further comprising:
   determining a fifth digest at said wireless access point, said fifth digest comprising said device identifier received from said authenticated client device, said first secret, said first random number, and said second random number, said fifth digest from which said wireless access point selects bits and determines said key; and
   calculating a sixth digest at said client device, said sixth digest comprising said device identifier, said first secret, said first random number and said second random number, said sixth digest from which said authenticated client device selects bits and determines said key.

5. A computer-useable medium having computer-readable code embodied thereon that is executed by a computer to implement a method of authenticating an unauthenticated client device and a network access point, said method comprising:
   first authenticating a wireless access point to an unauthenticated client device communicatively coupled to the wireless access point via a wireless connection;
   second authenticating the unauthenticated client device to the wireless access point to produce an authenticated client device and a key;
   third authenticating, via the wireless access point, a user of the authenticated client device to a central authentication server using the key; and
      wherein the method of authenticating an unauthenticated client device and a network access point further comprises:

receiving a first message from said unauthenticated client device at said wireless access point, said first message including a device identifier and a first random number;

receiving a second message from said wireless access point at said unauthenticated client device, said second message including a second random number and a first digest, said first digest including a one-way hash function operating on said first random number, said device identifier, and a first secret shared between said wireless access point and said unauthenticated client device;

determining a second digest at said unauthenticated client device, said second digest comprising a one-way hash function operating on said first random number, said device identifier, and said first secret;

comparing said first digest to said second digest at said unauthenticated client device; and provided said first digest matches said second digest, authenticating said wireless access point to said unauthenticated client device.

6. The computer-useable medium recited in claim 5, wherein the method of authenticating an unauthenticated client device and a network access point further comprises:

receiving a third message from said unauthenticated client device at said wireless access point, said third message including a third digest, said third digest including a one-way hash function operating on said second random number, said device identifier, and said first secret;

determining a fourth digest at said wireless access point, said fourth digest comprising said second random number, said device identifier, and said first secret;

comparing said third digest to said fourth digest at said unauthenticated client device; and provided said third digest matches said fourth digest, authenticating said client device to said wireless access point to produce the authenticated client device.

7. The computer-useable medium recited in claim 6, wherein the method of authenticating an unauthenticated client device and a network access point further comprises:

determining a fifth digest at said wireless access point, said fifth digest comprising said device identifier received from said authenticated client device, said first secret, said first random number, and said second random number, said fifth digest from which said wireless access point selects bits and determines said key; and calculating a sixth digest at said client device, said sixth digest comprising said device identifier, said first secret, said first random number and said second random number, said sixth digest from which said authenticated client device selects bits and determines said key.

* * * * *